(12) United States Patent
Chen et al.

(10) Patent No.: US 12,238,736 B2
(45) Date of Patent: Feb. 25, 2025

(54) METHOD AND APPARATUS FOR RECEIVING PHYSICAL DOWNLINK SHARED CHANNEL

(71) Applicant: GUANGDONG OPPO MOBILE TELECOMMUNICATIONS CORP., LTD., Dongguan (CN)

(72) Inventors: Wenhong Chen, Dongguan (CN); Zhihua Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 376 days.

(21) Appl. No.: 17/735,059

(22) Filed: May 2, 2022

(65) Prior Publication Data

US 2022/0264627 A1 Aug. 18, 2022

Related U.S. Application Data

(63) Continuation of application No. PCT/CN2019/121376, filed on Nov. 27, 2019.

(51) Int. Cl.
*H04J 3/00* (2006.01)
*H04L 5/00* (2006.01)
*H04W 72/23* (2023.01)

(52) U.S. Cl.
CPC ............ *H04W 72/23* (2023.01); *H04L 5/0035* (2013.01)

(58) Field of Classification Search
CPC ............ H04W 72/23; H04W 72/0446; H04W 72/1273; H04W 84/12; H04W 84/18; H04W 28/04; H04W 28/06; H04L 5/0035; H04L 5/0044; H04L 5/0094; H04L 1/08; H04L 5/0053

See application file for complete search history.

(56) References Cited

U.S. PATENT DOCUMENTS

| 11,025,456 B2* | 6/2021 | Chatterjee ............. H04L 5/0048 |
| 2011/0268102 A1 | 11/2011 | Zhu et al. |
| 2019/0053211 A1* | 2/2019 | Ying ................... H04W 72/044 |

(Continued)

FOREIGN PATENT DOCUMENTS

| CN | 106575996 A | 4/2017 |
| CN | 109152050 A | 1/2019 |

(Continued)

OTHER PUBLICATIONS

Second Office Action issued in corresponding European application No. 19954463.6, mailed Apr. 8, 2024.

(Continued)

*Primary Examiner* — Phuongchau Ba Nguyen
(74) *Attorney, Agent, or Firm* — BAYES PLLC (57) ABSTRACT

Embodiments of the present application disclose a method for configuring a physical downlink shared channel (PDSCH). The method includes receiving, by a terminal device, a time domain resource allocation list for at least one Physical Downlink Shared Channel (PDSCH) transmission through RRC signaling; and not expecting, by the terminal device, to receive a PDSCH aggregation factor when at least one time domain resource allocation in the time domain resource allocation list includes a Ultra-Reliable Low-Latency Communication (URLLC) repetition number.

12 Claims, 4 Drawing Sheets

(56) References Cited

U.S. PATENT DOCUMENTS

| | | | |
|---|---|---|---|
| 2019/0306856 | A1 | 10/2019 | Ji et al. |
| 2019/0313433 | A1 | 10/2019 | Abedini et al. |
| 2020/0221485 | A1* | 7/2020 | Cirik .................... H04L 5/0051 |
| 2020/0337029 | A1* | 10/2020 | Yi .......................... H04W 72/23 |
| 2021/0022158 | A1* | 1/2021 | Wei ....................... H04L 1/0025 |
| 2021/0320753 | A1* | 10/2021 | Shimezawa ........... H04L 1/1816 |
| 2022/0061067 | A1* | 2/2022 | Andersson ............ H04W 72/23 |
| 2022/0183004 | A1* | 6/2022 | Huang .................. H04L 5/0007 |
| 2022/0394708 | A1* | 12/2022 | Gao .................. H04W 72/0446 |

FOREIGN PATENT DOCUMENTS

| | | |
|---|---|---|
| CN | 110167170 A | 8/2019 |
| CN | 110351027 A | 10/2019 |
| CN | 110391890 A | 10/2019 |
| CN | 111092695 A | 5/2020 |
| EP | 4057731 A1 | 9/2022 |

OTHER PUBLICATIONS

Notice of Allowance issued in corresponding Japanese application No. 2022-529707, mailed May 31, 2024.

First Office Action issued in corresponding Japanese application No. 2022-529707, mailed Dec. 5, 2023.

Source: Huawei, HiSilicon; Title: Summary of Proposals for M-TRP Offline Session on Wednesday 3GPP TSG RAN WG1 Meeting #99 R1-1913461 Reno, USA, Nov. 18-22, 2019.

First Office Action issued in corresponding Indian application No. 202227026772, mailed Sep. 9, 2022.

First Office Action issued in corresponding Chinese application No. 202110975953.X, mailed Nov. 29, 2022.

International Search Report issued in corresponding International Application No. PCT/CN2019/121376, mailed Aug. 31, 2020, 25 pages.

Written Opinion of the International Searching Authority issued in corresponding International Application No. PCT/CN2019/121376, mailed Aug. 31, 2020, 7 pages.

"3rd Generation Partnership Project; Technical Specification Group Radio Access Network; NR; Physical layer procedures for data (Release 16)", 3GPP TS 38.214 V16.3.0 (Sep. 2020), 165 pages.

"Remaining issues on multi-TRP/panel transmission", Agenda Item: 7.2.8.2, Source: CATT, 3GPP TSG RAN WG1 #99, R1-1912176, Reno, USA, Nov. 18-22, 2019, 21 pages.

"3rd Generation Partnership Project; Technical Specification Group Radio Access Network; NR; Radio Resource Control (RRC) protocol specification (Release 16)", 3GPP TS 38.331 V16.2.0 (Sep. 2020), 916 pages.

"Enhancements on multi-TRP/panel transmission", Agenda Item: 7.2.8.2, Source: KDDI, 3GPP TSG RAN WG1 Meeting #98bis, R1-1911209, Chongqing, China, Oct. 14-18, 2019, 6 pages.

Extended European Search Report issued in corresponding European application No. 19954463.6, mailed Dec. 6, 2022.

Second Office Action issued in corresponding Chinese application No. 202110975953.X, mailed Feb. 16, 2023.

Nokia, "Introduction of NR enhanced MIMO", R1-1913203, 3GPP TSG-RAN WG1 Meeting #99 Reno, USA, Nov. 18-22, 2019.

Notice of Allowance issued in corresponding Chinese application No. 202110975953.X, mailed Aug. 3, 2023.

First Office Action issued in corresponding European application No. 19954463.6, mailed Sep. 22, 2023.

\* cited by examiner

METHOD AND APPARATUS FOR RECEIVING PHYSICAL DOWNLINK SHARED CHANNEL

CROSS-REFERENCE TO RELATED APPLICATIONS

This application is a continuation application of International Application No. PCT/CN2019/121376, entitled "METHOD AND APPARATUS FOR RECEIVING PHYSICAL DOWNLINK SHARED CHANNEL" filed on Nov. 27, 2019, the contents of which is incorporated herein by reference in its entirety.

TECHNICAL FIELD

Embodiments of the present disclosure generally relate to communication technologies, and more particularly, to a method and device for receiving a physical downlink shared channel.

BACKGROUND

In order to improve transmission reliability, the 5th generation (5G) mobile communication system supports aggregated transmissions of Physical Downlink Shared Channel (PDSCH) and Ultra-Reliable Low-Latency Communication (URLLC) repetitions. In the aggregated PDSCH transmissions, a network device can retransmit the PDSCH in multiple consecutive slots through the same transmission/reception point (TRP), and the number of PDSCH retransmissions is indicated by higher layer signaling. In URLLC repetitions, a network device can retransmit the PDSCH in multiple slots, the network device can use different TRPs to retransmit the PDSCH in the multiple slots, and the number of retransmissions is determined by DCI signaling.

If the network device configures the above-mentioned two transmission methods for a terminal device at the same time, the two transmission methods may conflict, resulting in that the terminal cannot determine which method to use to receive the PDSCH.

SUMMARY

Embodiments of the present disclosure provide a method and device for receiving a PDSCH, which can avoid the conflict between the above-mentioned two transmission methods.

According to a first aspect, there is provided a method for receiving a PDSCH, including:
  determining a PDSCH aggregation factor and a first time domain resource allocation, wherein the first time domain resource allocation is a time domain resource allocation list configured by higher layer signaling, or the first time domain resource allocation is a time domain resource allocation determined from a time domain resource allocation list configured by higher layer signaling according to Downlink Control Information (DCI); and
  receiving at least one PDSCH according to the PDSCH aggregation factor and/or the first time domain resource allocation.

The terminal device may determine the specific time domain position of the PDSCH in the slot according to the first time domain resource allocation. Based on different situations of the first time domain resource allocation, the terminal device can choose to use the PDSCH aggregation factor or not to use the PDSCH aggregation factor when receiving at least one PDSCH, thereby avoiding the conflict between aggregated PDSCH transmissions and URLLC repetitions.

According to a second aspect, there is provided a method for receiving a PDSCH, including:
  receiving a time domain resource allocation list for a Physical Downlink Shared Channel (PDSCH) transmission, wherein at least one time domain resource allocation in the time domain resource allocation list includes a Ultra-Reliable Low-Latency Communication (URLLC) repetition number; and
  not expecting to receive a PDSCH aggregation factor.

The not expecting to receive the PDSCH aggregation factor may be interpreted as: when the PDSCH aggregation factor is received, the terminal device determines not to receive the PDSCH; or the terminal device does not expect to be configured with the URLLC repetition number and the PDSCH aggregation factor at the same time. Therefore, the method can avoid the conflict between the aggregated PDSCH transmissions and URLLC repetitions.

According to a third aspect, there is provided a device for receiving a PDSCH configured to realize the functions corresponding to the method according to the first aspect or the second aspect. The function can be realized by hardware, or by hardware executing corresponding software. The hardware or software includes one or more units or modules corresponding to the above-mentioned functions.

In a possible design, the device is a terminal device or a chip. The device may include a processing unit and a transceiving unit. When the device is a terminal device, the processing unit may be a processor, and the transceiving unit may be a transceiver. The terminal device may further include a storage unit, and the storage unit may be a memory. The storage unit is used to store instructions, and the processing unit executes the instructions stored in the storage unit, so that the terminal device performs the method described in the first aspect or the second aspect. When the device is a chip in a terminal device, the processing unit may be a processor, and the transceiving unit may be an input/output interface, a pin or a circuit, etc. The processing unit executes the instructions stored in a storage unit to cause the terminal device including the chip to perform the method described in the first aspect or the second aspect. The storage unit may be a storage unit (for example, a register, a cache, etc.) in the chip, or a storage unit (for example, read only memory, random access memory, etc.) of the terminal device located outside the chip.

According to a fourth aspect, there is provided a computer-readable storage medium configured to store a computer program. When the computer program is executed by a processor, the processor is caused to perform the method according to the first or second aspect.

According to a fifth aspect, there is provided a computer program product including computer program codes. When the computer program codes are executed by a processor, the processor is caused to perform the method according to the first aspect or the second aspect.

According to a sixth aspect, there is provided a computer program. When the computer program is run on a computer, the computer is caused to perform the method according to the first aspect or the second aspect.

DETAILED DESCRIPTION

The technical solutions in embodiments of the present disclosure will be described below with reference to drawings. Obviously, the described embodiments are a part of the embodiments of the present disclosure, not all of the embodiments. Based on the embodiments described herein, all other embodiments obtained by those of ordinary skill in the art without creative work shall fall within the protection scope of the present disclosure.

Figure 1:
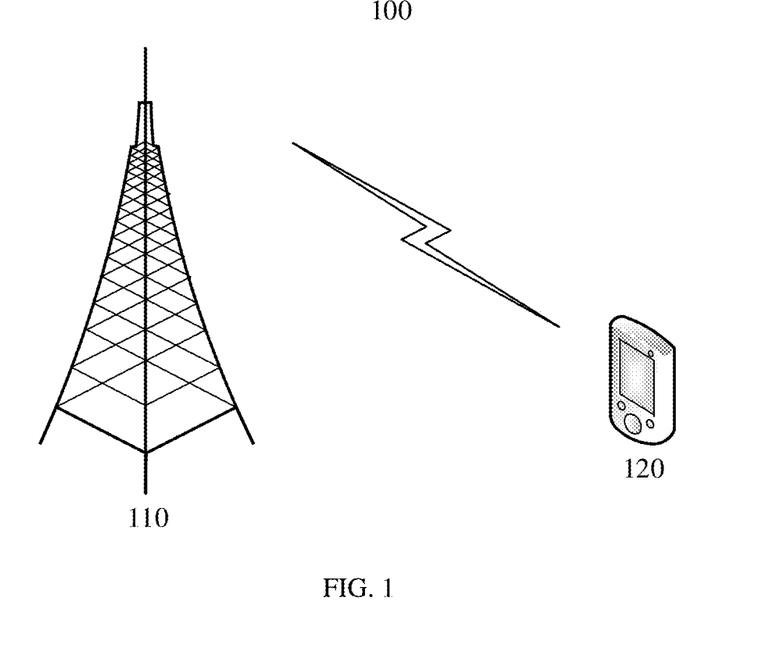
FIG. 1 is a schematic diagram of a communication system suitable for embodiments of the present disclosure.

The application scenarios of the present disclosure will be introduced first. FIG. 1 is a schematic diagram of a communication system suitable for embodiments of the present disclosure.

The communication system 100 includes a network device 110 and a terminal device 120. The terminal device 120 communicates with the network device 110 through electromagnetic waves.

In embodiments of the present disclosure, the terminal device 120 may include various handheld devices with wireless communication functions, vehicle-mounted devices, wearable devices, computing devices, or other processing devices connected to a wireless modem, for example, user equipment (UE) defined in 3rd Generation Partnership Project (3GPP), mobile station (MS), soft terminal, home gateway, set-top box, etc.

The network device 110 may be a base station defined in 3GPP, for example, a base station (gNB) in a 5G mobile communication system. Alternatively, the network device 110 may be a non-3GPP access network device, such as an access gateway (AG). According to some other embodiments, the network device 110 may be a relay station, an access point, a vehicle-mounted device, a wearable device, or other types of devices.

The communication system 100 is only an example, and the communication system applicable to embodiments of the present disclosure is not limited to this.

For example, the number of network devices and terminal devices included in the communication system 100 may be other numbers.

In order to improve transmission reliability, a network device can use aggregated PDSCH transmissions to transmit downlink data. The network device can configure a PDSCH aggregation factor (pdsch-AggregationFactor) for a terminal device through Radio Resource Control (RC) signaling. When the terminal device is scheduled to receive the PDSCH, the terminal device needs to repeatedly receive the PDSCH in M (M is a positive integer) consecutive slots according to the PDSCH aggregation factor. The scheduling method for the network device to schedule the terminal device to receive the PDSCH can be dynamic scheduling or semi-continuous scheduling.

Figure 2:
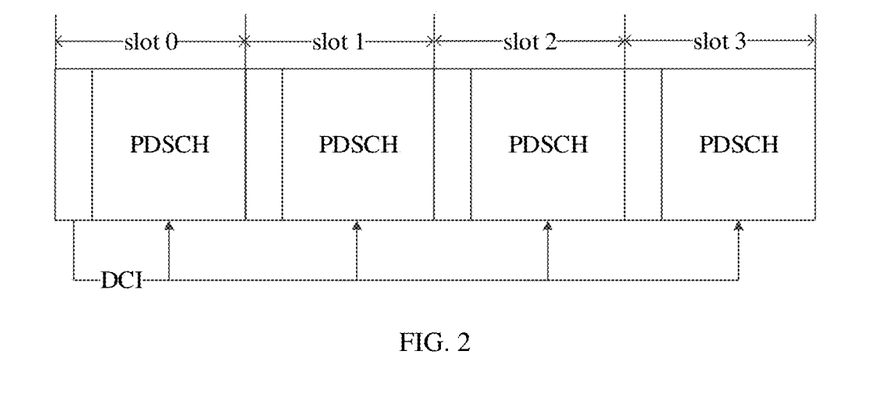
FIG. 2 is a schematic diagram showing aggregated PDSCH transmissions according to an embodiment of the present disclosure.

FIG. 2 is a schematic diagram showing aggregated PDSCH transmissions according to an embodiment of the present disclosure.

The PDSCH aggregation factor configured by the network device is 4, and the network device schedules the terminal device to receive the PDSCH in slot 0 through DCI. After receiving the DCI, the terminal device, starting from slot 0, receives the PDSCH in 4 consecutive slots, that is, the terminal device receives the PDSCHs in slot 0, slot 1, slot 2, and slot 3. The frequency domain resources and time domain resources used by the 4 PDSCHs may be the same or different. The 4 PDSCHs using the same time domain resources means that the time domain resources in the slots occupied by the 4 PDSCHs are the same.

For example, the PDSCH in slot 0 and the PDSCH in slot 1 occupy the same time domain resources, which can be understood as: the serial numbers of symbols occupied by the PDSCH in slot 0 are the same as the serial numbers of symbols occupied by the PDSCH in slot 1.

When the network device decides to use URLLC repetitions to transmit the PDSCH, the network device can configure the URLLC repetition number (URLLCRepNum) for the terminal device. The network device can pre-configure a time domain resource allocation list (pdsch-TimeDomain-AllocationList) through RRC signaling. The list includes one or more PDSCH time domain resource allocations (PSDCH-TimeDomainResourceAllocation). The PDSCH time domain resource allocation is an RRC parameter, which can include the URLLC repetition number. The terminal device can, according to a Time Domain Resource Allocation) (TDRA) field in the DCI, determines one time domain resource allocation from the time domain resource allocation list. If the one time domain resource allocation determined by the terminal device from the time domain resource list does not include the URLLC repetition number, the terminal device does not need to repeatedly receive the PDSCH. If the one time domain resource allocation determined by the terminal device from the time domain resource list includes the URLLC repetition number, the terminal device repeatedly receives the PDSCH according to the URLLC repetition number. In the above-mentioned time domain resource allocation list, the remaining parameters other than the URLLC repetition number can be used in the aggregated PDSCH transmissions.

In the URLLC repetition scenarios, if the PDSCHs in different slots are transmitted by different TRPs, different TRPs can use different beams. In this case, the network device needs to indicate multiple Transmission Configuration Indicator (TCI) states, and each TCI state is used for repetition of a TRP.

Figure 3:
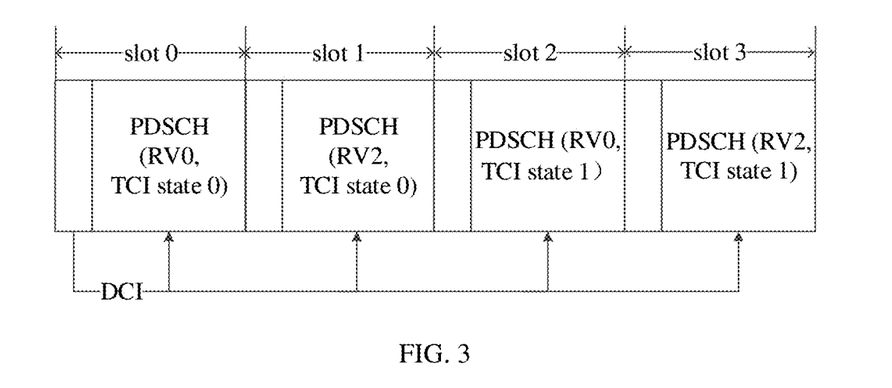
FIG. 3 is a schematic diagram showing a URLLC repetition according to an embodiment of the present disclosure.

FIG. 3 is a schematic diagram showing a URLLC repetition according to an embodiment of the present disclosure.

The number of URLLC repetitions determined by the terminal device is 4, and the network device schedules the terminal device to receive the PDSCH in slot 0 through the DCI. After receiving the DCI, the terminal device, starting from slot 0, receives the PDSCH in 4 consecutive slots, that is, the terminal device receives the PDSCH in slot 0, slot 1, slot 2, and slot 3. The frequency domain resources and time domain resources used by the 4 PDSCHs may be the same or different. The 4 PDSCHs using the same time domain resources means that the time domain resources occupied by the 4 PDSCHs in the slots are the same.

For example, the PDSCH in slot 0 and the PDSCH in slot 1 occupy the same time domain resources, which can be understood as: the serial numbers of symbols occupied by the PDSCH in slot 0 are the same as the serial numbers of symbols occupied by the PDSCH in slot 1.

Figure 4:
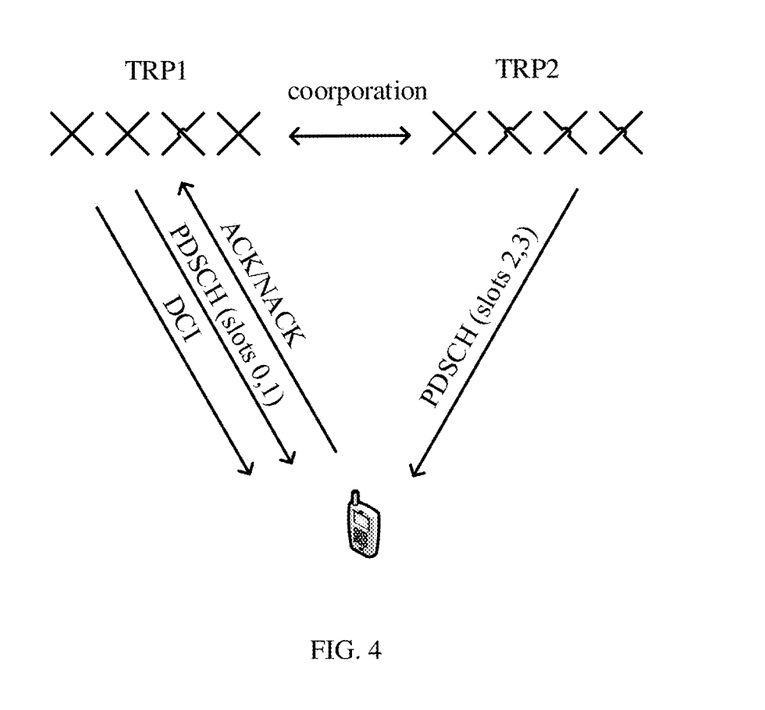
FIG. 4 is a schematic diagram showing another URLLC repetition according to an embodiment of the present disclosure.

DCI can indicate two TCI states and one redundancy version (RV). The two TCI states are TCI state 0 and TCI state 1. The RV is RV0. TCI state 0 corresponds to TRP1, and TCI state 1 corresponds to TRP2, and RV0 corresponds to the PDSCH in slot 0. As shown in FIG. 4, if TRP1 transmits PDSCH in slot 0 and slot 1, and TRP2 transmits PDSCH in slot 2 and slot 3, the terminal device receives PDSCH from TRP1 in slot 0 based on the RV0 and TCI state 0. The terminal device may determine that the redundancy version in slot 1 is RV2 according to a preset rule, and receive the PDSCH from TRP1 based on RV2 and TCI state 0. Subsequently, the terminal device may receive the PDSCH from TRP2 based on RV0 and TCI state 1, and receive the PDSCH from TRP2 based on RV2 and TCI state 1.

In addition, the terminal device can send an acknowledgement (ACK) or a negative acknowledgement (NACK) to TRP1, indicating the receptions of the PDSCH which is received for four times.

In the following, the method for resolving the conflict between the above two transmission methods according to embodiments of the present disclosure will be described.

Figure 5:
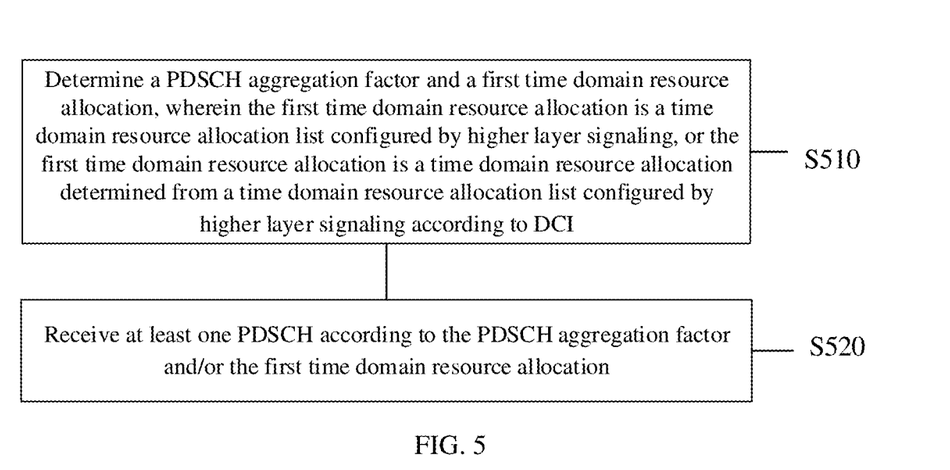
FIG. 5 is a schematic diagram of a method for receiving a PDSCH according to an embodiment of the present disclosure.

As shown in FIG. 5, the method includes the following steps.

In S510, a PDSCH aggregation factor and a first time domain resource allocation are determined. The first time domain resource allocation is a time domain resource allocation list configured by higher layer signaling, or the first time domain resource allocation is a time domain resource allocation determined from a time domain resource allocation list configured by higher layer signaling according to DCI.

The method shown in FIG. 5 may be performed by a terminal device or a chip in the terminal device. The higher layer signaling is, for example, RRC signaling. The method for the terminal device to determine the first time domain resource allocation is as shown in the above examples related to time domain resource allocations.

In the present disclosure, "first" and "second" are used to distinguish different ones of objects of the same type.

For example, the terms "first time domain resource allocation" and "second time domain resource allocation" are two different time domain resource allocations, and there are no other restrictions on the meaning of the two terms.

After determining the PDSCH aggregation factor and the first time domain resource allocation, the terminal device can perform the following step.

In S520, at least one PDSCH is received according to the PDSCH aggregation factor and/or the first time domain resource allocation.

The terminal device may determine the specific time domain position of the PDSCH in the slot according to the first time domain resource allocation.

In addition, based on different situations of the first time domain resource allocation, the terminal device can choose to use the PDSCH aggregation factor or not to use the PDSCH aggregation factor when receiving at least one PDSCH, thereby avoiding the conflict between the aggregated PDSCH transmissions and URLLC repetitions.

In embodiments of the present disclosure, the at least one PDSCH refers to one or more PDSCHs that transmits the same data, or the at least one PDSCH is referred to as repetitions of the same PDSCH.

Three methods of how the terminal device receives the PDSCH will be described below.

Method 1: the first time domain resource allocation is a time domain resource allocation list. Case 1-1 and Case 1-2 below are two exemplary embodiments of Method 1.

Case 1-1: at least one time domain resource allocation in the time domain resource allocation list includes the URLLC repetition number.

In the process of performing S520, the terminal device may determine a second time domain resource allocation from the time domain resource allocation list according to a TDRA field in the DCI for scheduling the at least one PDSCH, and receive the at least one PDSCH according to the second time domain resource allocation. The PDSCH aggregation factor is not used for receiving the at least one PDSCH, that is, when at least one time domain resource allocation in the domain resource configuration list includes the URLLC repetition number, the priority of the URLLC repetition number in the first time domain resource allocation is higher than the priority of the PDSCH aggregation factor.

The second time domain resource allocation may include the URLLC repetition number, or may not include the URLLC repetition number.

When the second time domain resource allocation includes the URLLC repetition number, the terminal device receives at least one PDSCH in N consecutive slots, where N is the URLLC repetition number included in the second time domain resource allocation, and N is a positive Integer.

For example, if N is equal to 4, the terminal device receives 4 PDSCHs in 4 consecutive slots.

When the second time domain resource allocation does not include the URLLC repetition number, the terminal device receives one PDSCH in one slot, and the slot may be determined based on the DCI indicating the second time domain resource allocation.

In Case 1-1, each PDSCH in the at least one PDSCH received by the terminal device includes one or two data streams. One data stream is, for example, data corresponding to a Demodulation Reference Signal (DMRS) port.

In addition, the DCI used for scheduling the at least one PDSCH may indicate at most two TCI states, that is, the DCI used for scheduling the at least one PDSCH may indicate one TCI state, or may indicate two TCI states, or may not indicate a TCI state.

Case 1-2: none of the time domain resource allocations in the time domain resource allocation list includes the URLLC repetition number, that is, the network device does not configure the URLLC repetition number in the higher layer signaling.

In the process of performing S520, the terminal device receives the at least one PDSCH in M consecutive slots, where M is a PDSCH aggregation factor, and M is an integer greater than 1.

In Case 1-2, the at least one PDSCH received by the terminal device includes one data stream.

In addition, the DCI used for scheduling the at least one PDSCH may indicate at most one TCI state, that is, the DCI used for scheduling the at least one PDSCH may indicate one TCI state, or may not indicate a TCI state.

Method 2: the first time domain resource allocation is a time domain resource allocation determined by the terminal device from a time domain resource allocation list configured by higher layer signaling according to DCI. Case 2-1 and Case 2-2 below are two exemplary embodiments of Method 2.

Case 2-1: the first time domain resource allocation includes the URLLC repetition number.

In the process of performing S520, the terminal device may receive at least one PDSCH in N consecutive slots, where N is the URLLC repetition number included in the first time domain resource allocation, and N is a positive integer. In this case, N may be an integer greater than 1. Alternatively, N may be an integer greater than or equal to 1. The at least one PDSCH includes one or two data streams.

In addition, the DCI for scheduling the at least one PDSCH indicates at most two TCI states, that is, the DCI for scheduling the at least one PDSCH may indicate one TCI state, or may indicate two TCI states, or may not indicate a TCI state.

Case 2-2: the first time domain resource allocation does not include the URLLC repetition number.

In the process of performing S520, the terminal device may receive at least one PDSCH in M consecutive slots, where M is a PDSCH aggregation factor, and M is an integer greater than 1. The at least one PDSCH includes one data stream.

In addition, the DCI used for scheduling the at least one PDSCH indicates at most one TCI state.

Method 3: the first time domain resource allocation is a time domain resource allocation determined by the terminal device from a time domain resource allocation list configured by higher layer signaling according to DCI. The following Case 3-1, Case 3-2, and Case 3-3 are three exemplary embodiments of Method 3.

Case 3-1: the first time domain resource allocation includes the URLLC repetition number, and the URLLC repetition number is greater than one.

In the process of performing S520, the terminal device may receive at least one PDSCH in N consecutive slots, where N is the URLLC repetition number included in the first time domain resource allocation, and N is a positive integer. The at least one PDSCH includes one or two data streams.

In addition, the DCI for scheduling the at least one PDSCH indicates at most two TCI states, that is, the DCI for scheduling the at least one PDSCH may indicate one TCI state, or may indicate two TCI states, or may not indicate a TCI state.

Case 3-2: the first time domain resource allocation includes the URLLC repetition number, and the URLLC repetition number is equal to one.

In the process of performing S520, the terminal device may receive at least one PDSCH in M consecutive slots, where M is a PDSCH aggregation factor, and M is an integer greater than 1. The at least one PDSCH includes one data stream.

In addition, the DCI used for scheduling the at least one PDSCH indicates at most one TCI state.

Case 3-3: the first time domain resource allocation does not include the URLLC repetition number.

In this case, the terminal device can adopt the same processing method as in Case 3-2.

The above has introduced examples of how to receive the PDSCH when the terminal device receives the PDSCH aggregation factor and the first time domain resource allocation. When the terminal device receives the time domain resource allocation list for PDSCH transmissions, and when at least one time domain resource allocation in the time domain resource allocation list includes the URLLC repetition number, the terminal device can perform the method shown in FIG. 6.

Figure 6:
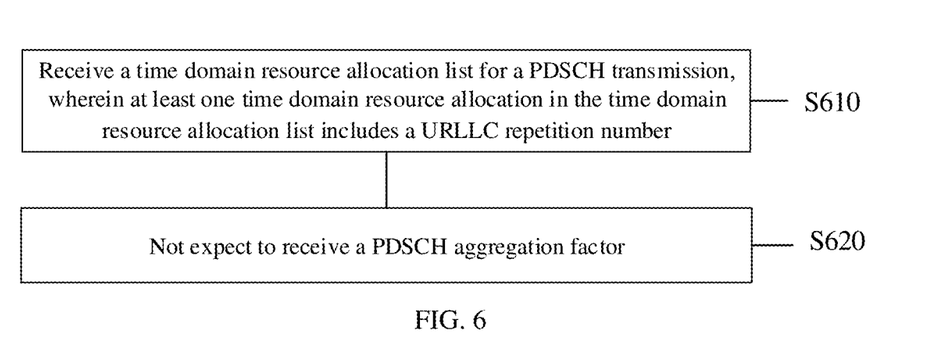
FIG. 6 is a schematic diagram of another method for receiving a PDSCH according to an embodiment of the present disclosure.

In S610, a time domain resource allocation list used for PDSCH transmissions is received. At least one time domain resource allocation in the time domain resource allocation list includes the URLLC repetition number.

In the above situation, the network device has sent the URLLC repetition number for PDSCH transmissions. If the network device also sends the PDSCH aggregation factor, there may be conflict between the aggregated PDSCH transmissions and the URLLC repetitions. Therefore, the terminal device can perform the following steps.

In S620, the terminal device does not expect to receive the PDSCH aggregation factor.

The terminal device not expecting to receive the PDSCH aggregation factor may be interpreted as: when the PDSCH aggregation factor is received, the terminal device determines not to receive the PDSCH; or the terminal device does not expect to be configured with the URLLC repetition number and the PDSCH aggregation factor at the same time.

Correspondingly, the network device does not send the PDSCH aggregation factor after sending the URLLC repetition number for PDSCH transmissions; or the network device does not configure the URLLC repetition number and the PDSCH aggregation factor at the same time.

Using the above methods, it is possible to avoid the conflict between the aggregated PDSCH transmissions and the URLLC repetitions.

The examples of the method for receiving a PDSCH provided in the present disclosure are described in detail above. It can be understood that, in order to realize the above-mentioned functions, an apparatus for receiving a PDSCH includes hardware structures and/or software modules corresponding to the functions. Those skilled in the art should easily realize that in combination with the units and algorithm steps of the examples described herein, embodiments of the present disclosure can be implemented in the form of hardware or a combination of hardware and computer software. Whether a certain function is implemented by hardware or hardware driven by computer software depends on the specific application and design constraint conditions of the technical solutions, and those skilled in this art can use different methods for each specific application to implement the described functions, but such implementations should not be considered as beyond the scope of the present disclosure.

The functional units in the device for receiving the PDSCH may be divided according to the foregoing method embodiments.

For example, functions may be divided into functional units, or two or more functions may be integrated into one processing unit. The functional units can be implemented in the form of hardware or software functional units. It should be noted that the division of units in the present disclosure is illustrative, and is only a logical function division, and there may be other division methods in actual implementations.

Figure 7:
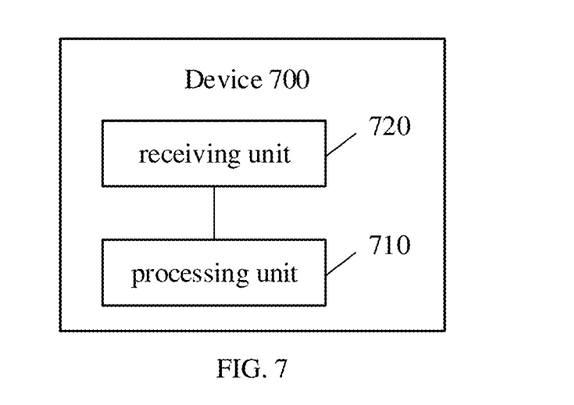
FIG. 7 is a schematic diagram of a device for receiving a PDSCH according to an embodiment of the present disclosure.

FIG. 7 is a schematic structural diagram of a device for receiving a PDSCH according to an embodiment of the present disclosure. The device 700 includes a processing unit 710 and a receiving unit 720. The receiving unit 720 can perform receiving steps under control of the processing unit 710.

The processing unit 710 is configured to determine a PDSCH aggregation factor and a first time domain resource allocation, wherein the first time domain resource allocation is a time domain resource allocation list configured by higher layer signaling, or the first time domain resource allocation is a time domain resource allocation determined from a time domain resource allocation list configured by higher layer signaling according to DCI.

The receiving unit 720 is configured to receive at least one PDSCH according to the PDSCH aggregation factor and/or the first time domain resource allocation.

According to exemplary embodiments of the present disclosure, when the first time domain resource is the time domain resource allocation list, the processing unit 710 is further configured to:

when at least one time domain resource allocation in the time domain resource allocation list includes a URLLC repetition number, determine a second time domain resource allocation from the time domain resource allocation list according to a TDRA field in the DCI for scheduling the at least one PDSCH;

the receiving unit 720 is configured to receive the at least one PDSCH according to the second time domain resource allocation.

According to exemplary embodiments of the present disclosure, when the second time domain resource allocation includes the URLLC repetition number, the receiving unit 720 is configured to:

receive the at least one PDSCH in N consecutive slots, wherein N is the URLLC repetition number included in the second time domain resource allocation, and N is a positive integer.

According to exemplary embodiments of the present disclosure, each PDSCH in the at least one PDSCH includes one or two data streams.

According to exemplary embodiments of the present disclosure, the DCI used for scheduling the at least one PDSCH indicates at most two TCI states.

According to exemplary embodiments of the present disclosure, the PDSCH aggregation factor is not used for receiving the at least one PDSCH.

According to exemplary embodiments of the present disclosure, when the first time domain resource allocation is the time domain resource allocation list, the receiving unit 720 is configured to:

when none of time domain resource allocations in the time domain resource allocation list includes a URLLC repetition number, receive the at least one PDSCH in M consecutive slots according to the PDSCH aggregation factor M, wherein M is the PDSCH aggregation factor, and M is an integer greater than 1.

According to exemplary embodiments of the present disclosure, each PDSCH in the at least one PDSCH includes one data stream.

According to exemplary embodiments of the present disclosure, the DCI used for scheduling the at least one PDSCH indicates at most one TCI state.

According to exemplary embodiments of the present disclosure, when the first time domain resource allocation is the time domain resource allocation determined from the time domain resource allocation list configured by higher layer signaling according to the DCI, the receiving unit 720 is configured to:

when the first time domain resource allocation includes a URLLC repetition number, receive the at least one PDSCH in N consecutive slots, wherein N is the URLLC repetition number, and N is a positive integer; or, when the first time domain resource allocation does not include the URLLC repetition number, receive the at least one PDSCH in M consecutive slots, wherein M is the PDSCH aggregation factor, and M is an integer greater than 1.

According to exemplary embodiments of the present disclosure, when the first time domain resource allocation includes the URLLC repetition number, each PDSCH in the at least one PDSCH includes one or two data streams.

According to exemplary embodiments of the present disclosure, when the first time domain resource allocation includes the URLLC repetition number, the DCI used for scheduling the at least one PDSCH indicates at most two TCI states.

According to exemplary embodiments of the present disclosure, when the first time domain resource allocation includes the URLLC repetition number, the PDSCH aggregation factor is not used for receiving the at least one PDSCH.

According to exemplary embodiments of the present disclosure, when the first time domain resource allocation does not include the URLLC repetition number, each PDSCH in the at least one PDSCH includes one data stream.

According to exemplary embodiments of the present disclosure, when the first time domain resource allocation does not include the URLLC repetition number, the DCI used for scheduling the at least one PDSCH indicates at most one TCI state.

According to exemplary embodiments of the present disclosure, when the first time domain resource allocation is the time domain resource allocation determined from the time domain resource allocation list configured by higher layer signaling according to the DCI, the receiving unit 720 is configured to:

when a URLLC repetition number in the first time domain resource allocation is greater than 1, receive the at least one PDSCH in N consecutive slots, wherein N is the URLLC repetition number, and N is a positive integer; or, when the URLLC repetition number in the first time domain resource allocation is equal to 1, receive the at least one PDSCH in M consecutive slots, wherein M is the PDSCH aggregation factor, and M is an integer greater than 1.

According to exemplary embodiments of the present disclosure, when the URLLC repetition number in the first time domain resource allocation is greater than 1, each PDSCH in the at least one PDSCH includes one or two data streams.

According to exemplary embodiments of the present disclosure, when the URLLC repetition number in the first time domain resource allocation is greater than 1, the DCI used for scheduling the at least one PDSCH indicates at most two TCI states.

According to exemplary embodiments of the present disclosure, when the first time domain resource allocation includes the URLLC repetition number, the PDSCH aggregation factor is not used for receiving the at least one PDSCH.

According to exemplary embodiments of the present disclosure, when the URLLC repetition number in the first time domain resource allocation is equal to 1, each PDSCH in the at least one PDSCH includes one data stream.

According to exemplary embodiments of the present disclosure, when the URLLC repetition number in the first time domain resource allocation is equal to 1, the DCI used for scheduling the at least one PDSCH indicates at most one TCI state.

For the specific manner in which the device 700 performs the method for receiving the PDSCH and the beneficial effects, reference may be made to the related description in the method embodiments.

Figure 8:
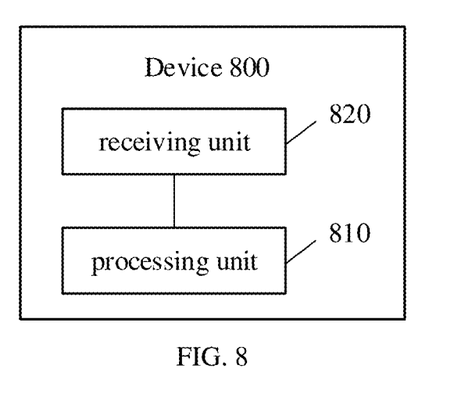
FIG. 8 is a schematic diagram of another device for receiving a PDSCH according to an embodiment of the present disclosure.

FIG. 8 is a schematic structural diagram of another device for receiving a PDSCH according to an embodiment of the present disclosure. The device 800 includes a processing unit 810 and a receiving unit 820. The receiving unit 820 can perform receiving steps under control of the processing unit 810.

The receiving unit 820 is configured to receive a time domain resource allocation list for a PDSCH transmission, wherein at least one time domain resource allocation in the time domain resource allocation list includes a URLLC repetition number.

The processing unit 820 is configured to, not expect to receive a PDSCH aggregation factor.

According to exemplary embodiments of the present disclosure, the processing unit 810 is configured to:
when the PDSCH aggregation factor is received by the receiving unit 820, determine not to receive the PDSCH.

For the specific manner in which the device 800 performs the method for receiving the PDSCH and the beneficial effects, reference may be made to the related description in the method embodiments.

Figure 9:
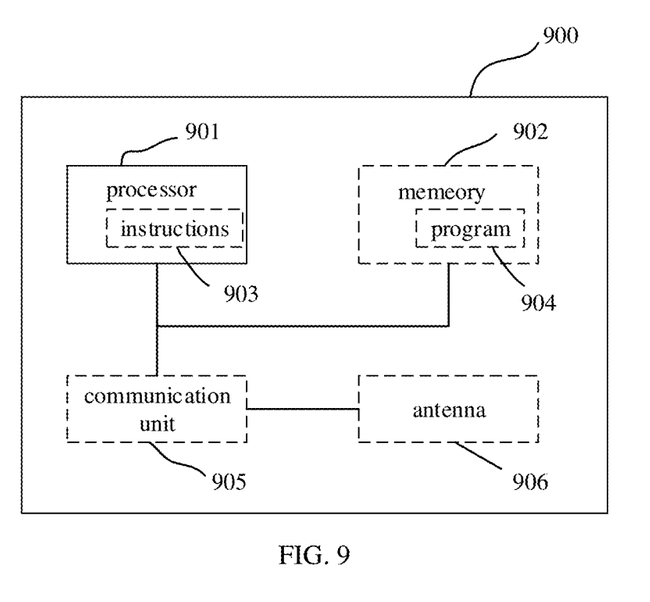
FIG. 9 is a schematic diagram of an apparatus for receiving a PDSCH according to an embodiment of the present disclosure.

FIG. 9 shows a schematic structural diagram of a device for receiving a PDSCH according to an embodiment of the present disclosure. The dotted lines in FIG. 9 indicate that the units or the modules are optional. The device 900 may be used to implement the methods described in the foregoing method embodiments. The device 900 may be a terminal device or a chip.

The device 900 includes one or more processors 901, and the one or more processors 901 can support the device 900 to implement the methods in the method embodiments corresponding to FIGS. 2 to 6. The processor 901 may be a general-purpose processor or a special-purpose processor.

For example, the processor 901 may be a Central Processing Unit (CPU). The CPU can be used to control the device 900 to execute software programs, and process data of the software programs. The device 900 may further include a communication unit 905 to implement signal input (reception) and output (transmission).

For example, the device 900 may be a chip, and the communication unit 905 may be an input and/or output circuit of the chip, or the communication unit 905 may be a communication interface of the chip, and the chip may be used as a constituting element of a terminal device or a network device or other wireless communication device.

For another example, the device 900 may be a terminal device, and the communication unit 905 may be a transceiver of the terminal device, or the communication unit 905 may be a transceiver circuit of the terminal device.

The device 900 may include one or more memories 902, on which a program 904 is stored. The program 904 can be run by the processor 901 to generate instructions 903, so that the processor 901 performs the methods described in the foregoing method embodiments according to the instructions 903. Optionally, data may also be stored in the memory 902. Optionally, the processor 901 may read data stored in the memory 902. The data may be stored at the same storage address as the program 904, or the data may be stored at a storage address different from the storage address of program 904.

The processor 901 and the memory 902 may be separately provided or integrated together, for example, the processor 901 and the memory 902 may be integrated on a system on chip (SOC) of a terminal device.

The device 900 may further include an antenna 906. The communication unit 905 is used to implement the transceiving function of the device 900 through the antenna 906.

For a specific manner in which the processor 901 performs the method for receiving the PDSCH, reference may be made to the related description in the method embodiments.

It should be understood that each step of the foregoing method embodiments may be completed by a logic circuit in the form of hardware or instructions in the form of software in the processor 901. The processor 901 may be a CPU, a Digital Signal Processor (DSP), an Application Specific Integrated Circuit (ASIC), a Field Programmable Gate Array (FPGA) or other programmable logic devices, such as, discrete gates, transistor logic devices, or discrete hardware components.

An embodiment of the present disclosure further provides a computer program product. When the computer program product is executed by the processor 901, the processor 901 is caused to perform the method described in any method embodiment of the present disclosure.

The computer program product may be stored in the memory 902, for example, may be the program 904. The program 904 is finally converted into an executable object file that can be executed by the processor 901 through processes such as preprocessing, compilation, assembly, and linking.

An embodiment of the present disclosure further provides a computer-readable storage medium on which a computer program is stored, and when the computer program is executed by a computer, the computer is caused to perform the method described in any method embodiment in the present disclosure. The computer program can be a high-level language program or an executable target program.

The computer-readable storage medium is, for example, the memory 902. The memory 902 can be a volatile memory or a non-volatile memory, or can include both volatile memory and non-volatile memory. The non-volatile memory can be a Read-Only Memory (ROM), a Programmable ROM (PROM), an Erasable PROM (EPROM), an Electrically EPROM (EEPROM) or a flash memory. The volatile memory can be a Random Access Memory (RAM) that serves as an external cache. By exemplary rather than limiting way, many forms of RAMs can be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM).

It may be clearly understood by those skilled in the art that details of specific operation procedures and produced technical effects of the devices and apparatuses can be found in the previous description regarding the method embodiments, and repeated descriptions are omitted here.

In the embodiments provided in the present disclosure, the disclosed systems, devices and methods may be implemented in other ways.

For example, some features in the above method embodiments may be omitted, or not executed. The device embodiments described above are merely illustrative.

For example, the division of the units is only a kind of logical function division. In practice, other division manner may be used.

For example, multiple units or components may be combined or integrated into another system.

In addition, the coupling between units or components may be direct coupling or indirect coupling, and the coupling may include connections in electrical, mechanical or other forms.

It should be understood that, in the various embodiments of the present disclosure, the sequence numbers of processes do not mean the order of execution. The execution order of the processes should be determined by their functions and internal logics, and the sequence numbers of the processes should not be construed as constituting any limitation on the implementations of the present disclosure.

In addition, the terms "system" and "network" are often used interchangeably herein. The term "and/or" is an association relationship that describes associated objects, which means that there can be three relationships, for example, A and/or B can mean: A alone, B alone, and A and B together.

In addition, the character "/" generally indicates that the associated objects before and after "/" are in an "or" relationship.

The above describes exemplary embodiments of the technical solutions of the present disclosure, and the exemplary embodiments are not used to limit the protection scope of the present disclosure. Any modification, equivalent replacement, or improvement, etc. made within the spirit and principle of the present disclosure shall be included in the protection scope of the present disclosure.

What is claimed is:

1. A method for receiving a physical downlink shared channel, comprising:
    receiving, by a terminal device, a time domain resource allocation list for at least one Physical Downlink Shared Channel (PDSCH) transmission by higher layer signaling, wherein at least one time domain resource allocation in the time domain resource allocation list comprises a Ultra-Reliable Low-Latency Communication (URLLC) repetition number; and
    receiving, by the terminal device, at least one PDSCH according to the time domain resource allocation list, wherein a PDSCH aggregation factor is not used;
    wherein the method further comprises:
    when none of time domain resource allocations in the time domain resource allocation list comprises the URLLC repetition number, determining, by the terminal device, a Physical Downlink Shared Channel (PDSCH) aggregation factor and a first time domain resource allocation, wherein the first time domain resource allocation is a time domain resource allocation list configured by higher layer signaling;
    wherein receiving, by the terminal device, the at least one PDSCH comprises:
    when none of time domain resource allocations in the time domain resource allocation list comprises the URLLC repetition number, receiving, by the terminal device, the at least one PDSCH in M consecutive slots according to the PDSCH aggregation factor M, wherein M is the PDSCH aggregation factor, and M is an integer greater than 1.

2. The method according to claim 1, further comprising:
    determining, by the terminal device, a second time domain resource allocation from the time domain resource allocation list according to a Time Domain Resource Allocation (TDRA) field in DCI for scheduling the at least one PDSCH, and receiving the at least one PDSCH according to the second time domain resource allocation.

3. The method according to claim 2, wherein receiving the at least one PDSCH according to the second time domain resource allocation comprises:
    receiving, by the terminal device, the at least one PDSCH in N consecutive slots, wherein N is the URLLC repetition number comprised in the second time domain resource allocation, and N is a positive integer.

4. The method according to claim 2, wherein each PDSCH in the at least one PDSCH comprises one or two data streams.

5. The method according to claim 2, wherein the DCI used for scheduling the at least one PDSCH indicates at most two Transmission Configuration Indicator (TCI) states.

6. A terminal device, comprising one or more processors, and memory storing a plurality of programs that, when executed by the one or more processors, cause the terminal device to:
    receive a time domain resource allocation list for at least one Physical Downlink Shared Channel (PDSCH) transmission by higher layer signaling, wherein at least one time domain resource allocation in the time domain resource allocation list comprises a Ultra-Reliable Low-Latency Communication (URLLC) repetition number; and
    receive at least one PDSCH according to the time domain resource allocation list, wherein a PDSCH aggregation factor is not used;
    wherein when the plurality of programs are executed by the one or more processors, the terminal device is caused to:
    determine a second time domain resource allocation from the time domain resource allocation list according to a Time Domain Resource Allocation (TDRA) field in DCI for scheduling the at least one PDSCH, and receive the at least one PDSCH according to the second time domain resource allocation;
    wherein when the plurality of programs are executed by the one or more processors, the terminal device is caused to:
    when none of time domain resource allocations in the time domain resource allocation list comprises the URLLC repetition number, determine a Physical Downlink Shared Channel (PDSCH) aggregation factor and a first time domain resource allocation, wherein the first time domain resource allocation is a time domain resource allocation list configured by higher layer signaling;
    wherein when the plurality of programs are executed by the one or more processors, the terminal device is caused to:
    when none of time domain resource allocations in the time domain resource allocation list comprises the URLLC repetition number, receive the at least one PDSCH in M consecutive slots according to the PDSCH aggregation factor M, wherein M is the PDSCH aggregation factor, and M is an integer greater than 1.

7. The terminal device according to claim 6, wherein when the plurality of programs are executed by the one or more processors, the terminal device is caused to:
    receive the at least one PDSCH in N consecutive slots, wherein N is the URLLC repetition number comprised in the second time domain resource allocation, and N is a positive integer.

8. The terminal device according to claim 6, wherein each PDSCH in the at least one PDSCH comprises one or two data streams.

9. The terminal device according to claim 6, wherein the DCI used for scheduling the at least one PDSCH indicates at most two Transmission Configuration Indicator (TCI) states.

10. A network device, comprising: one or more processors, and memory storing a plurality of programs that, when executed by the one or more processors, cause the network device to:

configure a time domain resource allocation list for at least one Physical Downlink Shared Channel (PDSCH) transmission; and not configure a PDSCH aggregation factor when the at least one time domain resource allocation in the time domain resource allocation list comprises a Ultra-Reliable Low-Latency Communication (URLLC) repetition number; and send the time domain resource allocation list for at least one Physical Downlink Shared Channel (PDSCH) transmission by higher layer signaling;

wherein when the plurality of programs are executed by the one or more processors, the network device is caused to:

send DCI for scheduling the at least one PDSCH, the DCI comprising a Time Domain Resource Allocation (TDRA) field; and send the at least one PDSCH;

wherein the DCI used for scheduling the at least one PDSCH indicates at most two Transmission Configuration Indicator (TCI) states;

wherein when the plurality of programs are executed by the one or more processors, the network device is caused to:

when none of time domain resource allocations in the time domain resource allocation list comprises a URLLC repetition number, send the at least one PDSCH in M consecutive slots, wherein M is a PDSCH aggregation factor, and M is an integer greater than 1.

11. The network device according to claim 10, wherein when the plurality of programs are executed by the one or more processors, the network device is caused to:

send the at least one PDSCH in N consecutive slots, wherein N is the URLLC repetition number comprised in a second time domain resource allocation in the time domain resource allocation list, and N is a positive integer.

12. The network device according to claim 10, wherein each PDSCH in the at least one PDSCH comprises one or two data streams.

* * * * *